(12) United States Patent
Kim et al.

(10) Patent No.: US 8,587,738 B2
(45) Date of Patent: Nov. 19, 2013

(54) LIQUID CRYSTAL DISPLAY DEVICE AND MANUFACTURING METHOD THEREOF

(75) Inventors: Jun-Young Kim, Yongin (KR); Shin-Jeong Han, Yongin (KR); Gyung-Min Ko, Yongin (KR)

(73) Assignee: Samsung Display Co., Ltd., Giheung-Gu, Yongin, Gyeonggi-Do (JP)

( * ) Notice: Subject to any disclaimer, the term of this patent is extended or adjusted under 35 U.S.C. 154(b) by 130 days.

(21) Appl. No.: 13/108,807

(22) Filed: May 16, 2011

(65) Prior Publication Data

US 2011/0292312 A1    Dec. 1, 2011

(30) Foreign Application Priority Data

May 28, 2010  (KR) ......................... 10-2010-0050385

(51) Int. Cl.
*G02F 1/1343*    (2006.01)
(52) U.S. Cl.
USPC ............................................. 349/38; 349/39
(58) Field of Classification Search
None
See application file for complete search history.

(56) References Cited

U.S. PATENT DOCUMENTS

| | | | | |
|---|---|---|---|---|
| 5,847,781 A | * | 12/1998 | Ono et al. | 349/44 |
| 2005/0219436 A1 | * | 10/2005 | Kwon et al. | 349/44 |
| 2006/0157705 A1 | * | 7/2006 | Ki | 257/59 |
| 2009/0090911 A1 | * | 4/2009 | Choi et al. | 257/59 |
| 2009/0122247 A1 | * | 5/2009 | Chang | 349/139 |

FOREIGN PATENT DOCUMENTS

| | | |
|---|---|---|
| KR | 10-2008-0035773 A | 4/2008 |
| KR | 10-2008-0062551 A | 7/2008 |
| KR | 10-2009-0036866 A | 4/2009 |

* cited by examiner

*Primary Examiner* — Thanh-Nhan P Nguyen
(74) *Attorney, Agent, or Firm* — Robert E. Bushnell, Esq.

(57) ABSTRACT

A liquid crystal display device (LCD) is constructed with a light blocking layer positioned on a data line region of a lower substrate defined by pixel regions and data line regions. A data line is positioned on the data line region of the lower substrate to overlap the light blocking layer with a gate insulating layer interposed therebetween. An organic insulating layer is positioned on the data line region of the lower substrate in order to cover the data line. Pixel electrodes are respectively positioned on the pixel regions to be spaced apart from the data line. Capacitors are respectively positioned on the pixel regions, and each of the capacitors has a lower electrode formed of a first transparent conductive material and an upper electrode formed of a second transparent conductive material, and the upper electrode is physically insulated from the data line with the organic insulating layer interposed therebetween.

18 Claims, 5 Drawing Sheets

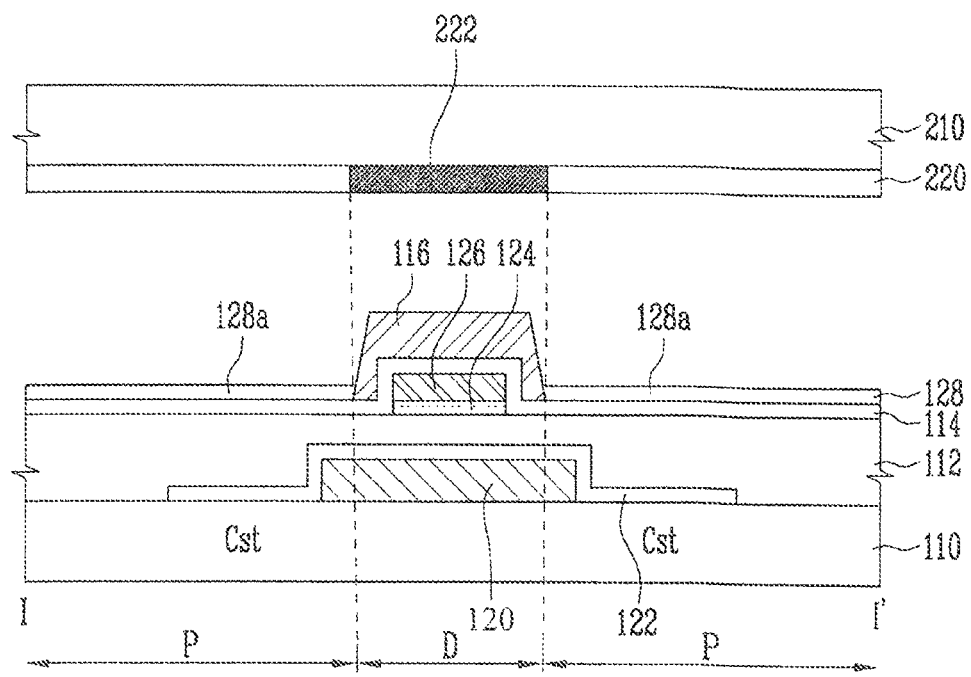

LIQUID CRYSTAL DISPLAY DEVICE AND MANUFACTURING METHOD THEREOF

CLAIM OF PRIORITY

This application makes reference to, incorporates the same herein, and claims all benefits accruing under 35 U.S.C. §119 from an application earlier filed in the Korean Intellectual Property Office on 28 May 2010 and there duly assigned Serial No. 10-2010-0050385.

BACKGROUND OF THE INVENTION

1. Field of the Invention

An aspect of the present invention relates to a liquid crystal display device (LCD) and a manufacturing method thereof, and more particularly, to an LCD capable of improving an aperture ratio and of simplifying processes, and a manufacturing method of the LCD.

2. Description of the Related Art

As demands on various types of display devices have recently been significantly increased with fast development of the information society, studies on display devices such as liquid crystal display device (LCD), plasma display panel (PDP), field emission display device (FED), electrophoretic display device (EPD) and organic light emitting display device (OLED) have been actively conducted.

SUMMARY OF THE INVENTION

It is therefore for the present invention to provide a liquid crystal display device (LCD) capable of improving an aperture ratio while simplifying the corresponding process of manufacture.

In one embodiment, there is provided a method for manufacturing the LCD.

In accordance with an aspect of the present invention, there is provided an LCD, including a light blocking layer positioned on a data line region of a lower substrate defined by pixel regions and data line regions; a data line positioned on the data line region of the lower substrate in order to overlap the light blocking layer with a gate insulating layer interposed between the light block layer and data line; an organic insulating layer positioned on the data line region of the lower substrate in order to cover the data line; pixel electrodes respectively positioned on the pixel regions and being spaced apart from the data line; and capacitors respectively positioned on the pixel regions, the capacitors each having a lower electrode formed of a first transparent conductive material and an upper electrode formed of a second transparent conductive material, and the upper electrode being physically insulated from the data line with the organic insulating layer interposed between the data line and the upper electrode.

The LCD may further include an interlayer insulating layer formed on a front surface of the gate insulating layer having the data line formed thereon; and an upper substrate having color filter layers respectively positioned to correspond to the pixel regions and a black matrix positioned to correspond to a data line region. The organic insulating layer may be a column spacer maintaining the space between the lower and upper susbtrates.

In accordance with an aspect of the present invention, there is provided a manufacturing method of an LCD. In the method, a light blocking layer is formed on a data line region of a lower substrate defined by pixel regions and data line regions. A lower electrode formed of a first transparent conductive material is formed on the pixel regions of the lower substrate having the light blocking layer formed thereon. A gate insulating layer is formed on a front surface of the lower substrate having the lower electrode formed thereon. A data line is formed on the data line region of the lower substrate to overlap the light blocking layer with the gate insulating layer interposed therebetween. An organic insulating layer is formed on the data line region of the lower substrate to cover the data line. Pixel electrodes and upper electrodes formed of a second transparent conductive material are respectively formed on the pixel regions to be spaced apart from the data line by the organic insulating layer.

The manufacturing method may further include steps of forming an interlayer insulating layer on a front surface of the gate insulating layer having the data line formed thereon; and joining the lower substrate with an upper substrate having color filter layers respectively positioned to correspond to the pixel regions and a black matrix positioned to correspond to a data line region.

The organic insulating layer may be formed to have a capping structure. The width of the organic insulating layer may be identical to or smaller than that of the light blocking layer. The organic insulating layer may be formed between the pixel electrodes of the pixel regions adjacent to each other with the data line interposed between the pixel electrodes. The first and second transparent conductive materials may be indium tin oxide (ITO) or indium zinc oxide (IZO).

Capacitors each having the lower and upper electrodes, may be formed with the gate insulating layer interposed therebetween. The capacitors may be formed on the pixel regions at both opposite side portions of the data line, respectively.

As described above, in accordance with embodiments of the present invention, capacitors are formed at both opposite sides of a data line, respectively, so that it is unnecessary either to form a capacitor at a side portion of a transistor or to separately form a black matrix corresponding to the capacitor at the side portion of the transistor. Accordingly, an aperture ratio may be improved.

Also, since a transparent conductive material is used as an electrode of the capacitor, the aperture ratio may be further enhanced.

Also, a constant distance between an upper electrode of the capacitor and the data line may be maintained by using the organic insulating layer, thereby preventing the signal delay on the data line. Also, the organic insulating layer is only formed on the data line, thereby improving the transmittance of the LCD.

Also, since the organic insulating layer is used as a column spacer by adjusting the thickness of the organic insulating layer formed only on the data line, it is unnecessary to separately form the column spacer on a color filter substrate. Accordingly, manufacturing processes may be simplified, and manufacturing costs may be reduced by decreasing the number of masks.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 3A through 3G are cross-sectional views illustrating manufacturing processes of the LCD shown in FIG. 2B.

DETAILED DESCRIPTION OF THE INVENTION

Figure 1:
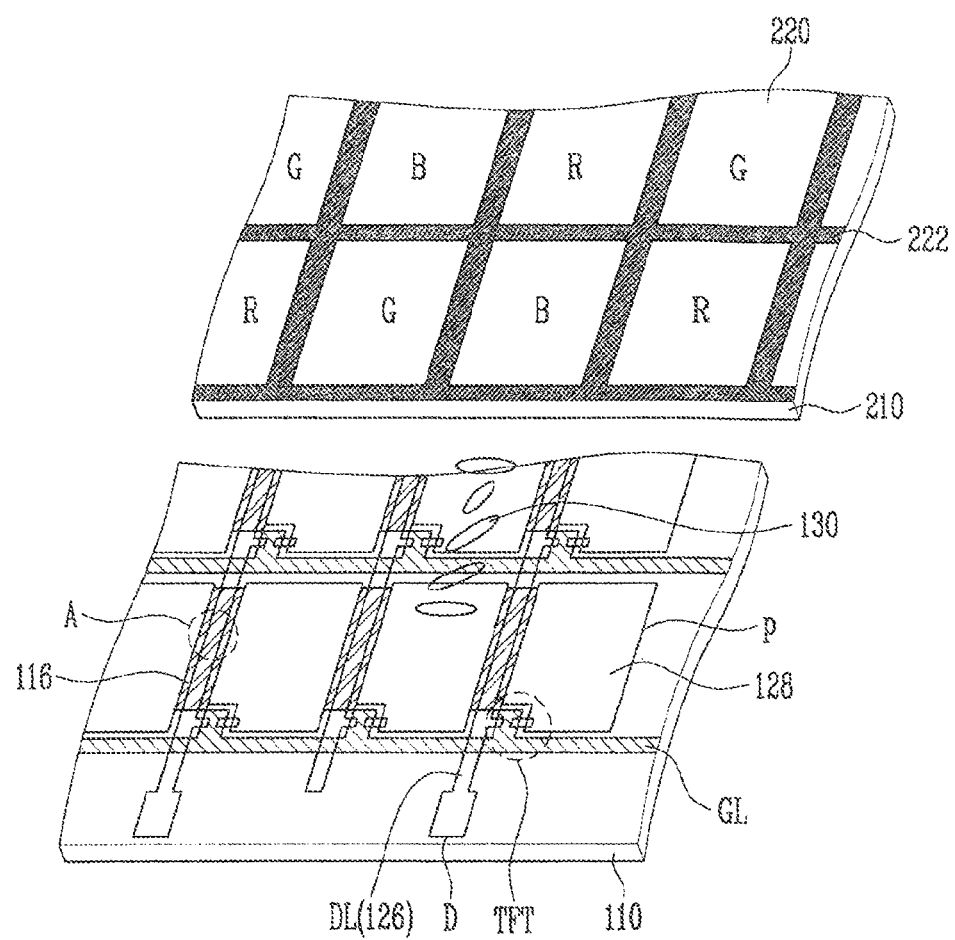
FIG. 1 is an exploded perspective view of a liquid crystal display device (LCD) constructed as an embodiment of the present invention.

The LCD is a display device that displays desired images by individually supplying a data signal based on external input image signal to pixels and by controlling light transmittance for each of the pixel. The LCD may be frequently driven in an active matrix (AM) mode. The AM mode is a mode in which a switching element such as thin film transistor (TFT) is added to each pixel so that voltage is applied to the liquid crystals in each pixel through the switching element and the liquid crystals are driven by the applied voltage.

Such LCDs may include a liquid crystal panel in which the pixels arranged in a matrix form, and a drive circuit that drives the liquid crystal panel. The liquid crystal panel may include an array substrate on which transistors and capacitors for driving liquid crystals are formed, a color filter substrate on which a color filter is formed, with the liquid crystals interposed between the two substrates.

Each of the transistors may be positioned at a junction such as an intersection portion of gate and data lines, and each of the capacitors is widely positioned at side portion of the transistor by electrodes respectively extended from opaque gate, source and drain electrodes of the transistor. A black matrix may be formed on the color filter substrate corresponding to regions at which the transistors and capacitors are formed. In this case, the black matrix may be formed in conjunction with the capacitor which is distributed and formed at the opposite side portions of the transistor. The black matrix is distributed on a large portion of the upper substrate, and the capacitors are distributed and formed on a large portion of the lower substrate.

The aperture ratio of the LCD may be decreased by the capacitor formed by the opaque electrodes and the black matrix formed on the color filter substrate in conjunction with the capacitor. Meanwhile, an organic insulating layer is formed to maintain a constant distance between a pixel electrode and a source/drain electrode, but the transmittance of the organic insulating layer may be lowered due to the concomitant increase of the thickness of the organic insulating layer.

It is therefore possible in the practice of this invention to provide a liquid crystal display device (LCD) capable of improving an aperture ratio and simplifying processes.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, a liquid crystal display device and a manufacturing method thereof according to embodiments of the present invention will be described in detail with respect to the accompanying drawings.

i) Shapes, sizes, rates, angles, numbers and the like, shown in the accompanying drawings, are provided only for illustrative purposes, and may be modified to some extent. ii) Since the drawings are viewed with observer's eyes, directions or positions described in the drawings may be variously modified depending on observer's positions. iii) Like reference numerals may be used to indicate like parts throughout the drawings.

iv) When the terms 'comprise', 'have', 'include' and the like are used, other parts may be added as long as the term 'only' is not used. v) The singular forms may be interpreted as the plural forms. vi) Even though the terms 'about', 'substantially' and the like are not used, shapes, comparisons between sizes, relations between positions, and the like are interpreted to include an ordinary error range.

vii) Even though the terms 'after', 'before', 'subsequently', 'also', 'here', 'at this time' and the like are used, they are not used to limit temporal positions. viii) The terms 'first', 'second', 'third' and the like are selectively, mutually or repeatedly used for distinguishing between similar elements and not used as confined meanings.

ix) When the position relation between two parts is described using the terms 'on', 'above', 'below', 'next' and the like, one or more parts may be positioned between the two parts as long as the term 'immediately' is not used. x) When parts are linked by the term 'or', they are interpreted individually or in combination, but when they are linked by the term 'or one of', they are only interpreted individually.

Liquid Crystal Display Device

FIG. 1 is an exploded perspective view of a liquid crystal display device (LCD) constructed as an embodiment of the present invention. In the embodiment of the present invention, an LCD driven in a twisted nematic (TN) mode, in-plane switching (IPS) mode or the like will be described as an example.

Referring to FIG. 1, the LCD constructed as the embodiment of the present invention may include lower and upper substrates 110 and 210 which are joined together with a space interposed therebetween, and a liquid crystal layer 130 may be injected in the space disposed between the lower and upper substrates 110 and 210.

R, G and B color filter layers 220 for reproducing colors and a black matrix 222 for intercepting light emitted from portions except the color filter layers 220 are formed on the upper substrate 210. The color filter layers 220 are positioned to correspond to pixel regions P on the lower substrate 110, respectively. The black matrix 222 is positioned to correspond to data line regions D and gate lines GL disposed between the pixel regions P. The surface of the upper substrate 210 where the black matrix 222 and color filter layers 220 are disposed faces towards the lower substrate 110.

In the practice of the present invention, the black matrix 222 is not formed at regions in which capacitors Cst are formed or at sides of transistors, but is formed only in the data line regions D in which data lines 126 are formed and only on the gate lines GL, thereby further improving the aperture ratio.

The lower substrate 110 may be defined by data line regions D and a plurality of pixel regions P. Here, a plurality of data lines DL 126 arranged in one direction at a constant interval are formed within the data line regions D. The pixel regions P are formed by intersecting the data lines DL (126) and a plurality of gate lines GL arranged in a direction perpendicular to the data lines DL (126) at a constant interval. Pixel electrodes 128 are formed in the respective pixel regions P.

Figure 2A:
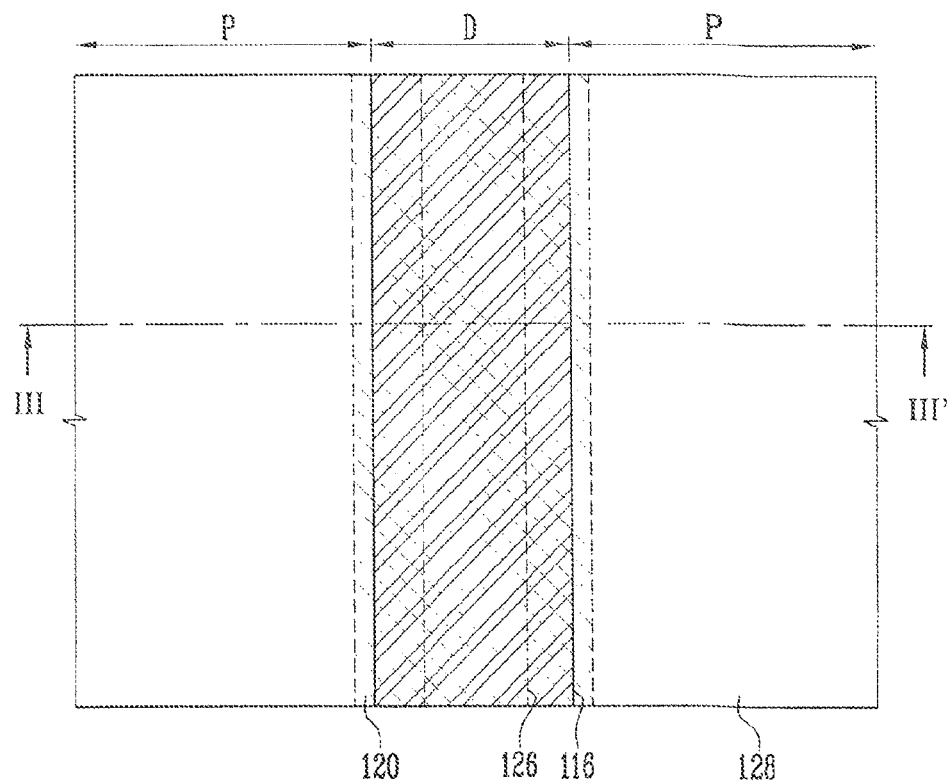
FIG. 2A is an enlarged plan view of portion A in the LCD shown in FIG. 1.
Figure 2B:
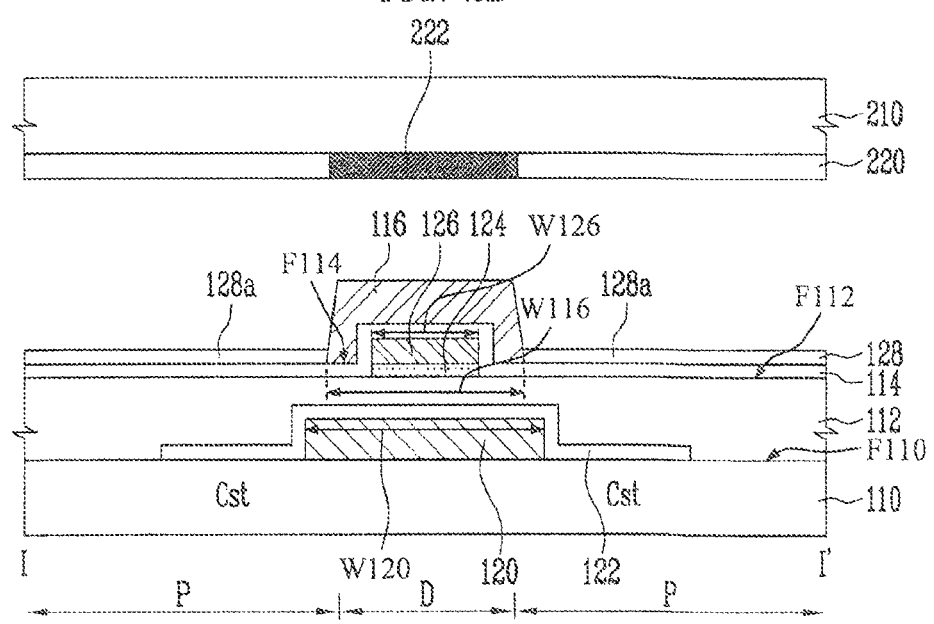
FIG. 2B is a sectional view taken along sectional line of FIG. 2A.

FIG. 2A is an enlarged view of portion A in the LCD shown in FIG. 1. FIG. 2B is a sectional view taken along line of FIG. 2A.

More specifically, referring to FIGS. 2A and 2B, a light blocking layer 120, a gate insulating layer 112, a data line 126 and an organic insulating layer 116 are formed on the lower substrate 110 of a data line region D defined as a region in which a data line 126 is formed between pixel regions P. A semiconductor layer 124 may be further formed beneath the data line 126 of the data line region D, and an interlayer insulating layer 114 may further formed between the data line 126 and the organic insulating layer 116.

The light blocking layer 120 is a layer for preventing leakage of light, and is positioned below the data line 126 with the gate insulating layer 112 interposed between the light blocking layer 120 and the data line 126. The width W120 of the light blocking layer 120 is greater than the width W126 of the data line 126. The width W120 of the light blocking layer 120 may be formed to be greater than of the width W126 of the data line 126, so that the light blocking layer 120 may possibly prevent light from leaking through or around the sides of the data lines 126 from a backlight unit.

The light blocking layer 120 may be positioned in the same layer as the gate line GL, and may be formed of the same material as the gate line GL. As an example, the light blocking layer 120 may be formed as a single-layered structure using a low electrical resistance opaque conductive material such as aluminum (Al), aluminum alloy (Al alloy), tungsten (W), copper (Cu), chromium (Cr) or molybdenum (Mo). Alternatively, the light blocking layer 120 may be formed into a multi-layered structure in which two or more low electrical resistance conductive materials are stacked.

The gate insulating layer 112 may be positioned on a front surface F110 of the lower substrate 110 in order to cover the light blocking layer 120, and the interlayer insulating layer 114 is positioned on a front surface F112 of the gate insulating layer 112 in order to cover data line 126. The gate insulating layer 112 and the interlayer insulating layer 114 may be formed of an inorganic insulating material. In one embodiment, the gate insulating layer 112 may completely cover the light blocking layer 120, and the interlayer insulating layer 114 may completely cover data line 126.

The data line 126 is used to apply a data signal to pixel electrodes 128. The data line 126 may be positioned in the same layer as source/drain electrodes, and may be formed of the same material as the source drain electrodes. The data line 126 is electrically connected to the pixel electrodes 128 through a drain electrode of a transistor. The data line 126 may be physically insulated from the pixel electrodes 128 respectively positioned at both of the opposite sides of the data line region D through the organic insulating layer 116.

The organic insulating layer 116 is positioned on the gate insulating layer 112 and/or the interlayer insulating layer 114 formed on the data line 126 into a capping structure in which the organic insulating layer 116 covers the data line 126.

In one embodiment, the organic insulating layer 116 completely covers the data line 126. When the data line DL 126 and the pixel electrodes 128 are insulated from each other using only the interlayer insulating layer 114 without the organic insulating layer 116, a sufficient spacing distance is not formed between the data line DL 126 and the pixel electrodes 128, and therefore, parasitic capacitance may occur between the data line DL 126 and the pixel electrodes 128.

The parasitic capacitance between the data line DL 126 and the pixel electrodes 128 may cause the signal delay of the data line. In the embodiment of the present invention, the organic insulating layer 116 is formed between adjacent pixel electrodes 128 and the organic insulating layer 116 covers the data line 126, so that the data line 126 is sufficiently distant from the pixel electrodes 128 or upper electrodes 128a. Accordingly, the occurrence of the parasitic capacitance may be reduced, thereby preventing the signal delay of the data line 126.

Meanwhile, when the organic insulating layer 116 is formed within the data line region D and up to a front surface F114 of the interlayer insulating layer 114, i.e., the pixel region P, the aperture ratio may be reduced and the parasitic capacitance of the capacitor may be decreased due to the great thickness of the organic insulating layer 116. However, in this embodiment of the present invention, the organic insulating layer 116 with the capping structure is positioned only within the data line region D, and therefore, it is possible to prevent the reduction of the aperture ratio and the decrease of the capacitance of the storage capacitor Cst.

The organic insulating layer 116 is positioned to overlap the light blocking layer 120 in a plan view of the display device. In this case, the width W116 of the organic insulating layer 116 may be formed identical to or smaller than that of the light blocking layer 120, so that the aperture ratio may be improved while maintaining a distance at which the occurrence of the parasitic capacitance between the data line 126 and the pixel electrodes 128 may be prevented.

The thickness of the organic insulating layer 116 may be 2 μm or thicker. In the embodiment of the present invention, the organic insulating layer 116 may be simultaneously used as a column spacer by adjusting the thickness of the organic insulating layer 116. In this case, the column spacer may be omitted.

Pixel electrodes 128 electrically connected to a drain electrode of a transistor TFT to generate an electric field and a capacitor Cst for maintaining and storing the electric field may be formed on the lower substrate 110 in each of the pixel regions P.

The pixel electrodes 128 may be formed of a transparent conductive material, and are positioned on the interlayer insulating layer 114 within the pixel regions P. Indium tin oxide (ITO) or indium zinc oxide (IZO) may be used as the transparent conductive material. The pixel electrodes 128 may be spaced apart from the data line 126 by the organic insulating layer 116.

The capacitor Cst may include lower and upper electrodes 122 and 128a formed with the gate insulating layer 112 and the interlayer insulating layer 114, interposed therebetween. The capacitors Cst may be respectively positioned in the pixel regions P adjacent to each other with the data line 126 interposed therebetween.

The lower electrode 122 of the capacitor Cst may be integrally formed of a transparent conductive material that completely covers the data line region D and at least a partial area of the pixel regions P adjacent to the data line region D, with the light blocking layer 120 being formed underneath the lower electrode 122 and being completely covered by the lower electrode 122. The transparent conductive material that constitutes the lower electrode 122 may be identical to a material used in a gate electrode of the transistor TFT.

The upper electrodes 128a are respectively positioned in the pixel regions P to be physically insulated from the data line 126 with the organic insulating layer 116 interposed therebetween. Since the upper electrode 128a is integrally formed with the pixel electrodes 128, the upper electrode 128a is formed of a transparent conductive material. ITO or IZO may be used as the transparent conductive material.

In the embodiment of the present invention, the lower electrode 122 of the capacitor Cst is not formed by extending an opaque light blocking layer or gate electrode but formed by using a separate transparent conductive material, so that the aperture area of the pixel region P may be increased, thereby improving the aperture ratio.

In addition, the capacitor Cst is not positioned at a side portion of the transistor but positioned at a side portion of the data line 126, and therefore, it is unnecessary to separately form the black matrix corresponding to the data line 126 at the side portion of the transistor. Accordingly, the aperture ratio may be further improved.

Manufacturing Method of LCD

Hereinafter, a manufacturing method of an LCD constructed as an embodiment of the present invention will be described with reference to FIGS. 3A through 3G. FIGS. 3A through 3G are sectional views illustrating manufacturing processes of the LCD shown in FIG. 2B.

Figure 3A:
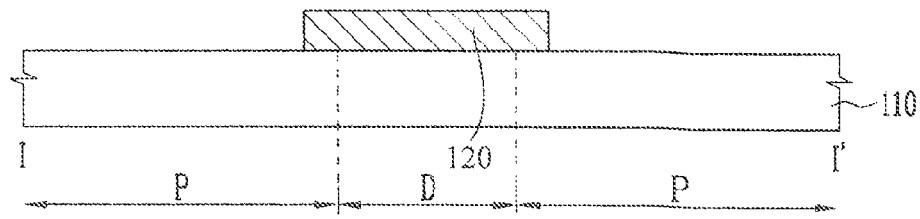

Referring to FIG. 3A, a light blocking layer 120 is formed on a data line region 15 of a lower substrate 110 defined by pixel regions P and data line regions D. In one embodiment, the light blocking layer 120 may completely cover the data line region D and cover a partial area of the pixel regions P connecting to the data line region D.

Specifically, a first opaque conductive material is deposited on the transparent lower substrate 110 and then patterned through a photolithography process using a mask, thereby forming the light blocking layer 120. The first opaque conductive material may include a low-resistance opaque conductive material such as aluminum (Al), aluminum alloy (Al alloy), tungsten (W), copper (Cu), chromium (Cr) or molybdenum (Mo). Alternatively, the light blocking layer 120 may be formed into a multi-layered structure in which two or more low-resistance conductive materials are stacked.

Figure 3B:
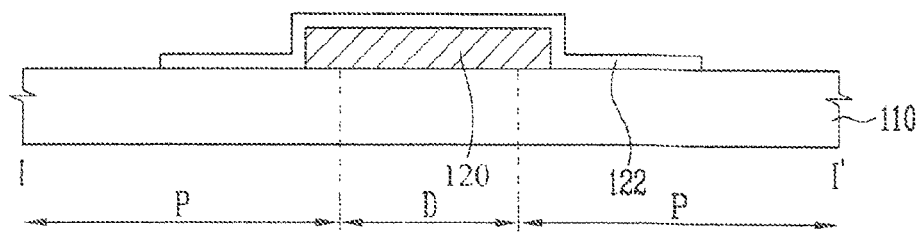

Referring to FIG. 3B, a lower electrode 122 is formed in the data line region and a partial area of the pixel regions P connecting to the data line region D. Here, the lower electrode 122 covers the light blocking layer 120 disposed on the lower substrate 110, and the lower electrode 122 is integrally formed to extend into the adjacent pixel regions P. In one embodiment, the lower electrode 122 may completely cover the light blocking layer 120.

Specifically, a first transparent conductive material is formed on the lower substrate 110 having the light blocking layer 120 formed thereon and then patterned through a photolithography process using a mask, thereby forming the lower electrode 122 formed of the first transparent conductive material. ITO or IZO may be used as the first transparent conductive material.

Figure 3C:
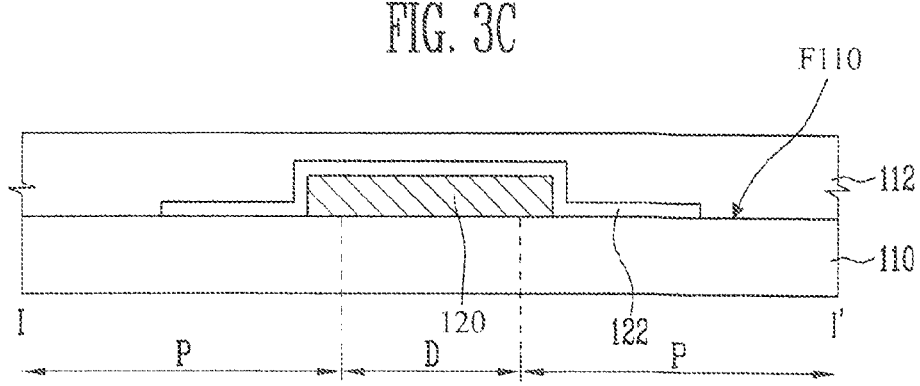

Referring to FIG. 3C, a gate insulating layer 112 is formed on a front surface F110 of the lower substrate 110 having the lower electrode 122 formed thereon. A silicon oxide, silicon nitride or silicon oxynitride may be used as the gate insulating layer 112.

Figure 3D:
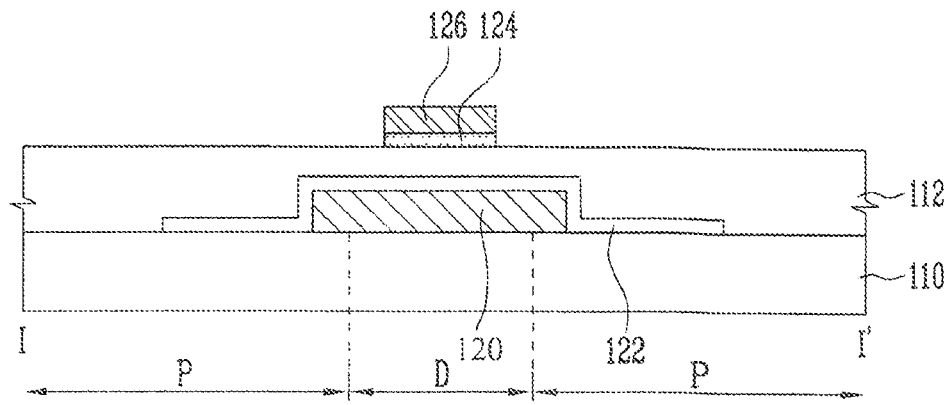

Referring to FIG. 3D, a data line 126 is formed on the gate insulating layer 112 of the data line region D so as to overlap the light blocking layer 120.

Specifically, a second opaque conductive material is deposited on the lower substrate 110 having the gate insulating layer 112 formed on the front surface thereof and then patterned through a photolithography process using a mask, thereby forming the data line 126 on the gate insulating layer 112 of the data line region D. The data line 126 is used to apply a data signal to pixel electrodes 128. The data line 126 may be positioned in the same layer as source/drain electrodes, and may be formed of the same material as the source drain electrodes.

In this case, a semiconductor layer 124 may be further formed beneath the data line 126, i.e., between the data line 126 and the gate insulating layer 112.

Figure 3E:
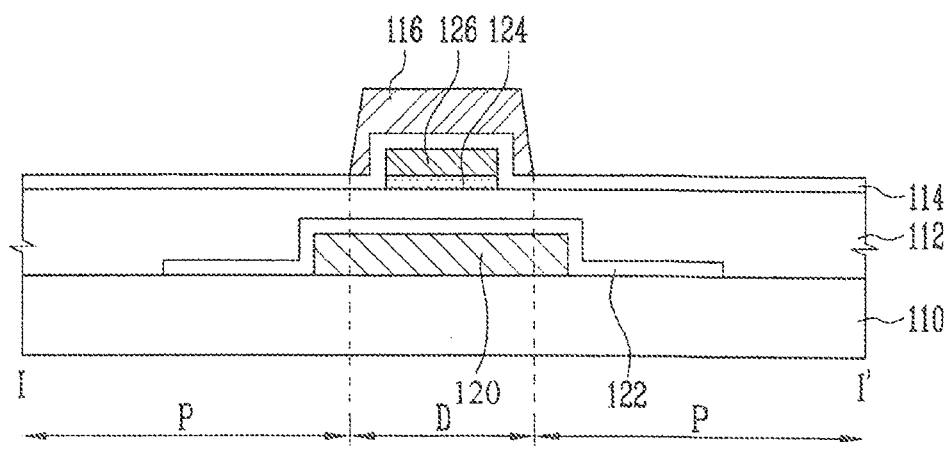

Referring to FIG. 3E, an interlayer insulating layer 114 is formed on the front surface of the lower substrate 110, and an organic insulating layer 116 is formed on the interlayer insulating layer 114 of the data line region D.

Specifically, the interlayer insulating layer 114 is formed on the data line region D and the pixel regions P of the lower substrate 110 having the data line 126 formed thereon. The interlayer insulating layer 114 may be formed of an inorganic insulating material. The inorganic insulating material may include an inorganic insulating material known in the art, including a silicon nitride, silicon oxide or silicon oxynitride.

Subsequently, an organic insulating layer is deposited on the entire surface of the lower substrate 110 having the interlayer insulating layer 114 formed thereon and then patterned through a photolithography process using a mask, thereby forming the organic insulating layer 116 with a capping structure in which the organic insulating layer 116 covers the data line 126.

The organic insulating layer 116 with the capping structure is positioned on the interlayer insulating layer 114 formed on the data line 126 so that the data line 126 is insulated from pixel electrodes 128 which will be formed later. In one embodiment, the organic insulating layer 116 having the capping structure may completely cover the protruding portion of the interlayer insulating layer 114. When the data line 126 and the pixel electrodes 128 are physically insulated from each other using only the interlayer insulating layer 114 without the organic insulating layer 116, a sufficient spacing distance is not formed between the data line 126 and the pixel electrodes 128, and therefore, parasitic capacitance may occur between the data line and the pixel electrodes.

The parasitic capacitance occurring between the data line 126 and the pixel electrodes 128 may cause the signal delay of the data line. In the embodiment of the present invention, the organic insulating layer 116 is formed on the interlayer insulating layer 114 to cover the data line 126, so that the data line 126 is sufficiently distant from the pixel electrodes 128. Accordingly, the occurrence of the parasitic capacitance may be reduced, thereby preventing the signal delay of the data line 126.

Meanwhile, when the organic insulating layer 116 is formed up to a front surface of the interlayer insulating layer 114, i.e., the pixel region P, the transmittance and aperture ratio may be reduced and the parasitic capacitance of the capacitor may be decreased due to the great thickness of the organic insulating layer 116. In an embodiment of the present invention, the organic insulating layer 116 with the capping structure is positioned only within the data line region D, and therefore, it is possible to prevent the reduction of the aperture ratio and the decrease of the capacitance of the capacitor Cst.

The organic insulating layer 116 is positioned to overlap the light blocking layer 120. In this case, the width of the organic insulating layer 116 is formed identical to or smaller than that of the light blocking layer 120, so that the aperture ratio may be improved while maintaining a distance between the data line 126 and the pixel electrodes 128 at which the occurrence of the parasitic capacitance between the data line 126 and the pixel electrodes 128 may be prevented.

The thickness of the organic insulating layer 116 may be 2 μm or thicker. In the embodiment of the present invention, the process of forming a column spacer may be omitted by adjusting the thickness of the organic insulating layer 116. Accordingly, manufacturing costs may be saved, and that manufacturing processes may be simplified.

Figure 3F:
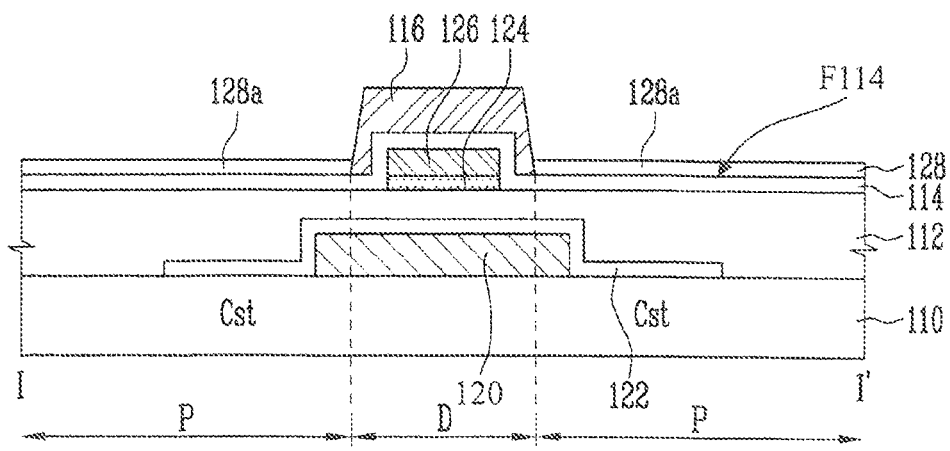

Referring to FIG. 3F, the pixel electrodes 128 and upper electrodes 128a are respectively formed in each of the corresponding pixel regions P, thereby completing capacitors Cst at both side portions of the data line 126.

Specifically, a second transparent conductive material is deposited on the front surface of the lower substrate 110 and then patterned through a photolithography process using a mask, thereby integrally forming the upper electrode 128a extended with the pixel electrodes 128. The upper electrode 128a is overlapped by the lower electrode 122 with the interlayer insulating layer 114 and the gate insulating layer 112, interposed therebetween.

The upper electrode 128a may be positioned in the pixel region P while being physically insulated from the data line 126 with the organic insulating layer 116 and the interlayer insulating layer 114, interposed therebetween. ITO or IZO may be used as the second opaque conductive material. The capacitors Cst are respectively formed in the pixel regions P adjacent to each other with the data line 126 interposed therebetween.

Referring to FIG. 3G; an upper substrate 210 is joined with the lower substrate 110 having the capacitors Cst, thereby completing an LCD. In this case, color filter layers 220 are positioned to correspond to the pixel regions P, respectively, and a black matrix 222 of the upper substrate 210 is positioned to correspond to the data line regions D. The black matrix 222 may be positioned to correspond to a gate line (not shown) of a transistor.

In the manufacturing method of the LCD according to the embodiment of the present invention, the capacitor Cst is formed of a transparent conductive material, and therefore, it is unnecessary to form the black matrix 222 to correspond to the region at which the capacitor Cst is formed. That is, the black matrix 222 is not formed on the region in which the capacitor Cst is formed or at a side portion of the transistor, but is formed only on a region in which the data line and the gate line are formed. Accordingly, the aperture ratio may be further improved.

While the present invention has been described in connection with certain exemplary embodiments, it is to be understood that the invention is not limited to the disclosed embodiments, but, on the contrary, is intended to cover various modifications and equivalent arrangements included within, the spirit and scope of the appended claims, and equivalents thereof.

What is claimed is:

1. A liquid crystal display device (LCD), comprising:
a light blocking layer positioned on a data line region of a lower substrate which comprises alternatingly disposed pixel regions and data line regions;
a data line positioned on the data line region of the lower substrate, and the data line overlapping the light blocking layer with a gate insulating layer interposed between the data line and the light blocking layer;
an organic insulating layer positioned on the data line region of the lower substrate, and the organic insulating layer covering the data line, the organic insulating layer being formed to have a capping structure;
pixel electrodes respectively positioned on the pixel regions, and the pixel electrodes being spaced apart from each other by the data line; and
capacitors respectively positioned on the pixel regions, each capacitor having a lower electrode formed of a first transparent conductive material and an upper electrode formed of a second transparent conductive material, and the lower electrode being overlapped with the light blocking layer and the upper electrode being physically insulated from the data line with the organic insulating layer interposed between the upper electrode and the data line.

2. The LCD according to claim 1, further comprising:
an interlayer insulating layer formed on a front surface of the gate insulating layer, with the front surface of the gate insulating layer having the data line formed thereon; and
an upper substrate having color filter layers respectively positioned to correspond to the pixel regions and a black matrix respectively positioned to correspond to the data line regions.

3. The LCD according to claim 1, wherein a width of the organic insulating layer is identical to or smaller in comparison with that of the light blocking layer.

4. The LCD according to claim 1, wherein the organic insulating layer is a column spacer maintaining a space between the lower substrate and an upper substrate.

5. The LCD according to claim 1, wherein the organic insulating layer is formed between the pixel electrodes respectively formed on adjacent pixel regions, with the data line interposed between the pixel electrodes.

6. The LCD according to claim 1, wherein the lower electrode covers the light blocking layer disposed on the data line region, and the lower electrode is integrally formed to extend into pixel regions adjacent to the data line region on which the lower electrode is disposed.

7. The LCD according to claim 1, wherein the upper electrode is integrally formed as a single body with the pixel electrode, and the upper electrode extends towards the pixel electrode.

8. The LCD according to claim 1, wherein the first and second transparent conductive materials are independently selected from indium tin oxide (ITO) and indium zinc oxide (IZO).

9. The LCD according to claim 1, wherein the capacitors are formed at both opposite side portions of the data line, respectively.

10. A manufacturing method of an LCD, comprising steps of:
forming a light blocking layer on a data line region of a lower substrate which comprises alternatingly disposed pixel regions and data line regions;
forming a lower electrode on a pixel region of the lower substrate by using a first transparent conductive material, with the lower electrode being overlapped with the light blocking layer;
forming a gate insulating layer on a front surface of the lower substrate, with the front surface of the lower substrate having the lower electrode formed thereon;
forming a data line on the data line region of the lower substrate, and the data line overlapping the light blocking layer with the gate insulating layer interposed between the data line and the light blocking layer;
forming an organic insulating layer on the data line region of the lower substrate, and the organic insulating layer covering the data line and the organic insulating layer being formed to have a capping structure; and
respectively forming pixel electrodes and upper electrodes on the pixel regions by using a second transparent conductive material, and the pixel electrodes and the upper electrodes being spaced apart from the data line by the organic insulating layer.

11. The manufacturing method according to claim 10, wherein a width of the organic insulating layer is formed identical to or smaller in comparison with that of the light blocking layer.

12. The manufacturing method according to claim 10, wherein the organic insulating layer is formed between the pixel electrodes respectively formed on adjacent pixel regions, with the data line interposed between the pixel electrodes.

13. The manufacturing method according to claim 10, wherein the lower electrode covers the light blocking layer of the data line region, and the lower electrode is integrally formed as a single body and extends into pixel regions adjacent to the data line region on which the lower electrode is formed.

14. The manufacturing method according to claim 10, wherein the upper electrode is integrally formed as a single body with the pixel electrode, and the upper electrode extends towards the pixel electrode.

15. The manufacturing method according to claim 10, wherein the first and second transparent conductive materials are independently selected from ITO and IZO.

16. The manufacturing method according to claim 10, wherein capacitors each having the lower and upper electrodes are formed with the gate insulating layer interposed between the capacitors.

17. The manufacturing method according to claim 16, wherein the capacitors are respectively formed on the pixel regions at both opposite side portions of the data line.

18. The manufacturing method according to claim 10, further comprising:
    forming an interlayer insulating layer on a front surface of the gate insulating layer having the data line formed thereon; and
    joining the lower substrate with an upper substrate having color filter layers respectively positioned to correspond to the pixel regions and a black matrix respectively positioned to correspond to the data line regions.

* * * * *